(No Model.)
R. HENDRICH.
UNICYCLE.
No. 520,678. Patented May 29, 1894.
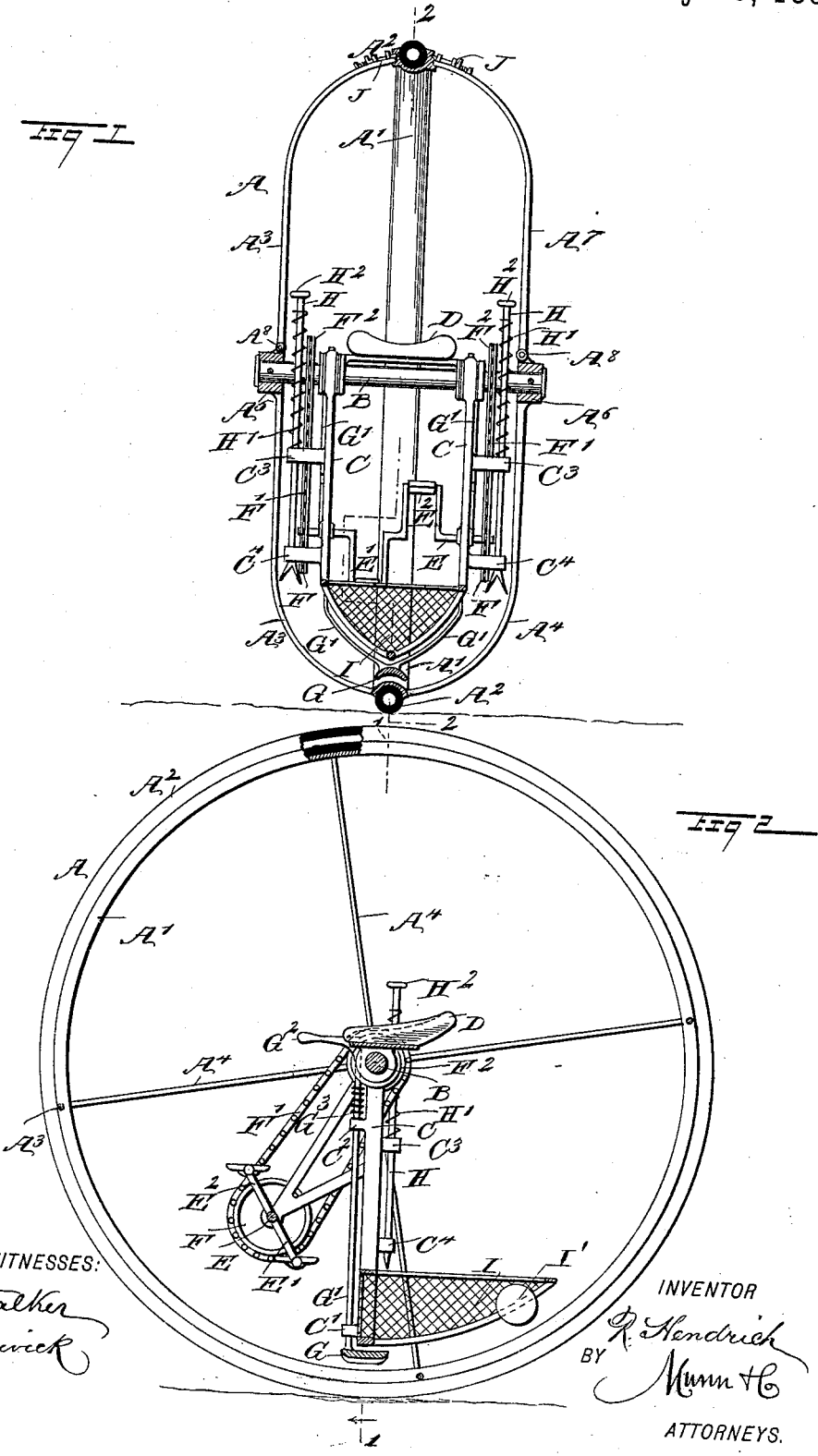
WITNESSES:
I. L. Walker
C. Sedgwick
INVENTOR
R. Hendrich
BY
Munn & Co.
ATTORNEYS.

UNITED STATES PATENT OFFICE.

ROBERT HENDRICH, OF CHICAGO, ILLINOIS.

UNICYCLE.

SPECIFICATION forming part of Letters Patent No. 520,678, dated May 29, 1894.

Application filed December 22, 1893. Serial No. 494,396. (No model.)

*To all whom it may concern:*

Be it known that I, ROBERT HENDRICH, of Chicago, in the county of Cook and State of Illinois, have invented a new and Improved Unicycle, of which the following is a full, clear, and exact description.

The object of the invention is to provide a new and improved unicycle, which is comparatively simple and durable in construction, very effective in operation, and arranged to conveniently support a rider and to permit of traveling at a high rate of speed.

The invention consists of certain parts and details, and combinations of the same, as will be hereinafter described and then pointed out in the claims.

Reference is to be had to the accompanying drawings, forming a part of this specification, in which similar letters of reference indicate corresponding parts in both the figures.

Figure 1 is a cross section of the improvement on the line 1—1 of Fig. 2; and Fig. 2 is a sectional side elevation of the same on the line 2—2 of Fig. 1.

The improved unicycle is provided with a wheel A, of a suitable diameter to permit a rider to be seated conveniently within the rim A' of the wheel. The rim A' is provided with a suitable cushion or other tire $A^2$, and with two webs $A^3$ and $A^4$, curved outwardly from the rim, so as to form a casing or cage within which the rider is located, while driving the unicycle.

The webs $A^3$ and $A^4$ are preferably made of spokes connected with central hubs $A^5$ and $A^6$, in which is secured the transversely extending shaft B. On this shaft is hung loosely a frame C supporting a seat D for the rider, the frame being also provided in its forwardly projecting lower end with journals in which is mounted to turn the crank shaft E, provided with two crank arms E', and $E^2$, adapted to be engaged by the feet of the rider seated on the seat D, so as to permit the rider to impart a rotary motion to the said crank shaft E. The latter is provided on its outer ends with sprocket wheels F, each connected by a chain F', with a second sprocket wheel $F^2$, secured on the main shaft B, on opposite sides of the seat D and within the hubs $A^5$ and $A^6$. Now, the rotary motion given to the crank shaft E is transmitted by the said sprocket wheels F, $F^2$ and chains F' to the main driving shaft B, so that the wheel A is rotated to roll off the ground, thereby imparting a forward movement to the unicycle.

In order to brake the wheel A, a brake shoe G, is provided, adapted to engage the inner surface of the rim A', the said shoe being held on a fork G', extending upwardly and fitted to slide in suitable bearings C' and $C^2$, held on the frame C. The upper end of each fork arm is provided with a forwardly-projecting handle $G^2$, extending to the sides of the seat D, so as to be within easy grasp of the operator seated on the seat D. Springs $G^3$ are coiled on the fork arms and serve to hold the latter in an uppermost normal position to hold the shoe G normally out of contact with the rim A'. Now, the operator, in pressing the handles $G^2$ downward, causes a downward movement of the fork arms and of the brake shoe G, to move the latter in contact with the inner surface of the rim A', so as to brake the wheel. By the rider releasing the pressure on the handles $G^2$, the brake shoe G moves out of contact with the rim by the action of the springs $G^3$.

In order to hold the unicycle in a firm position while the operator is mounted or whenever he desires to stop on the road, I provide two vertically-disposed rods H, fitted to slide in suitable guides $C^3$ and $C^4$, formed on the frame C. A spring H', on each of the rods serves to hold the lower forked ends of the said rods above the ground, the upper ends of the said rods being provided with handles $H^2$, adapted to be engaged by the rider. Now, when the rider presses the handles $H^2$, the rods H slide downward, so that the pronged lower ends of the rods engage the ground on opposite sides of the tire $A^2$, thus firmly supporting the unicycle in an upright position.

On the lower end of the frame C and extending rearwardly is secured a basket I, adapted to support merchandise or other articles to be carried along on the road. On a rod of this basket I is held adjustable a weight I' to counterbalance the weight of the rider on the seat D.

In order to enable the rider to readily pass in or out of the cage formed by the wheel A, I prefer to form one of the spokes $A^7$ on each side with a hinge $A^8$ on the hub $A^6$, as plainly shown in Fig. 1, the outer free end of the said hinged spoke being provided with a locking device J, adapted to engage a suitable keeper on the side of the rim A'. Now, by unlocking this spoke A⁷ it can be swung open to give sufficient room for the convenient ingress or egress of the rider.

It will be seen that as the frame C is hung loosely on the shaft B, it will always retain its position while the wheel A is traveling forward, and owing to the large diameter of the wheel, a very high rate of speed can be obtained.

The handles H² permit the operator to steer the unicycle, as a lateral pressure on the handle causes the wheel to turn either to the right or left according to the direction of the pressure.

Having thus fully described my invention, I claim as new and desire to secure by Letters Patent—

1. In a unicycle, the combination with a wheel having a transverse shaft secured in the hubs thereof, of a counterbalanced frame loosely hung from the shaft and carrying a seat above the said shaft, a crank shaft mounted in the said frame, sprocket wheels on the ends of the crank shaft, sprocket wheels on the transverse shaft, and chains passing around said sprocket wheels, substantially as described.

2. In a unicycle, the combination with a wheel having a transverse shaft secured in the hubs thereof, of a frame loosely hung from the shaft, and having a forwardly projecting portion, a seat carried by the frame above the said shaft a weight carried by a support projecting rearwardly from the frame, a crank shaft mounted in the forwardly projecting portion of the said frame, sprocket wheels on the ends of the crank shafts, sprocket wheels on the transverse shaft, and chains passing around the said sprocket wheels, substantially as herein shown and described.

ROBERT HENDRICH.

Witnesses:
CARL HEINRICH KOHN,
GEORGE SCHREINER.